Jan. 31, 1950 — E. J. COOK — 2,495,956
METHOD OF PRODUCING GLASS FIBERS
Filed Nov. 13, 1945 — 3 Sheets-Sheet 1
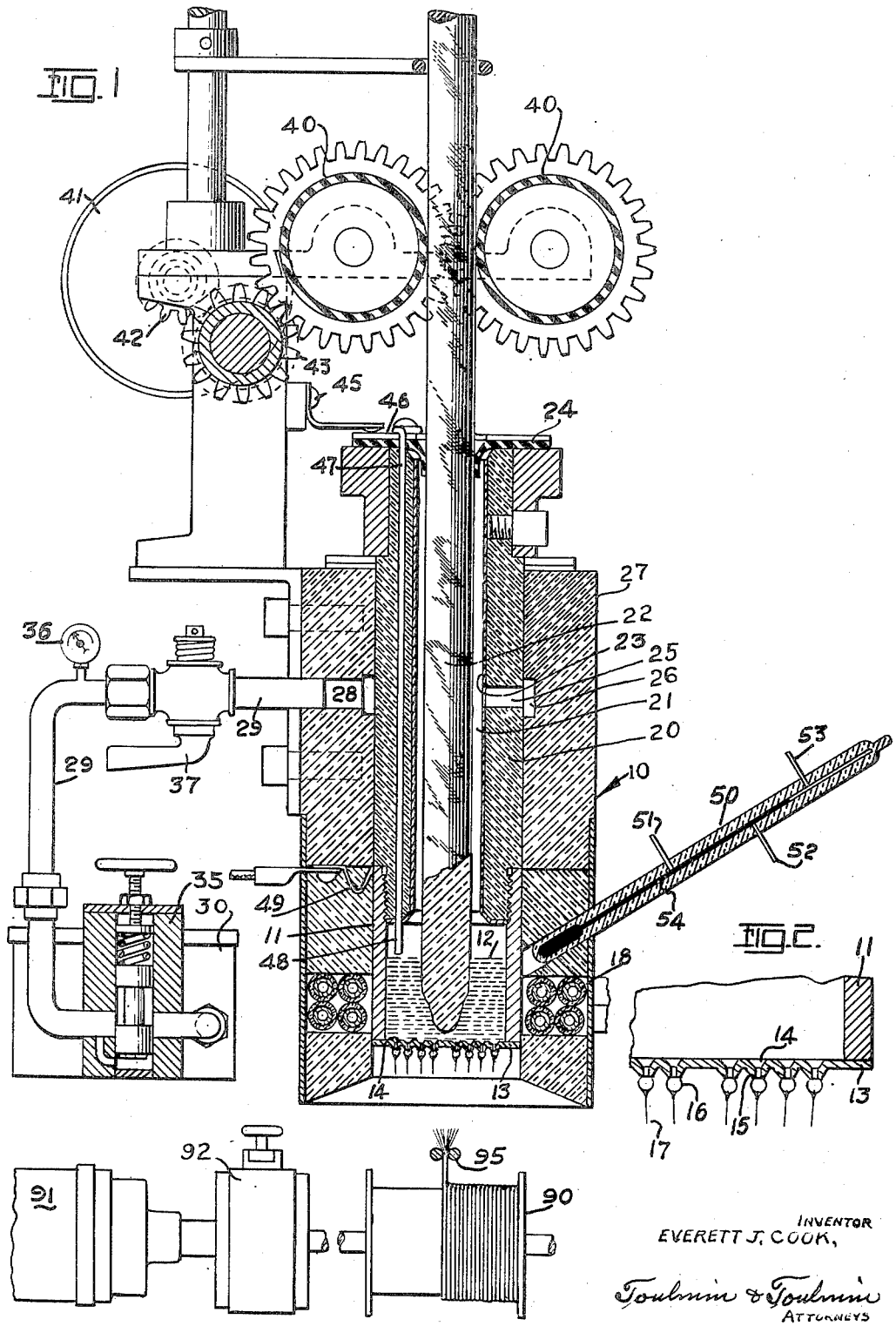
INVENTOR
EVERETT J. COOK,
Toulmin & Toulmin
ATTORNEYS

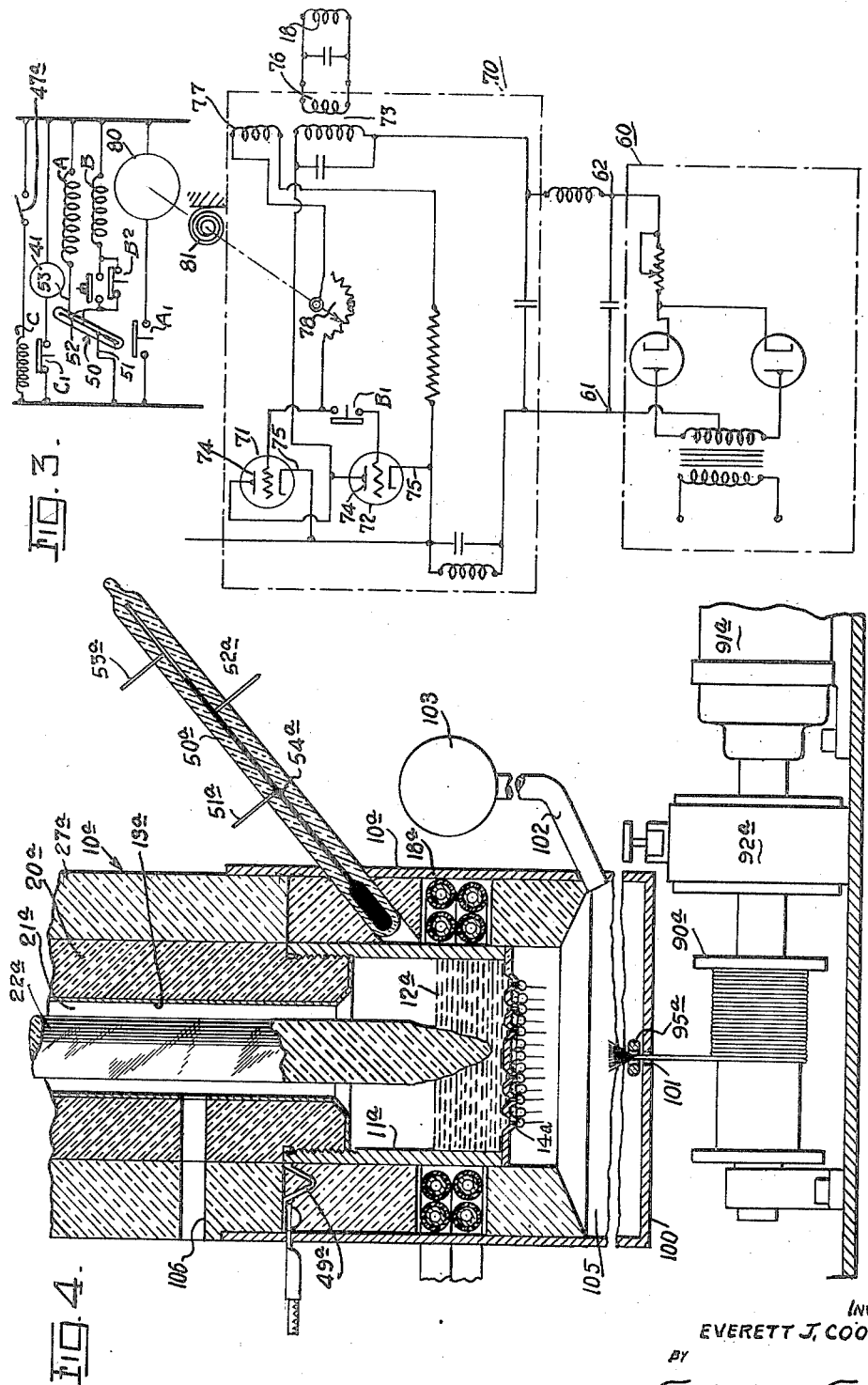

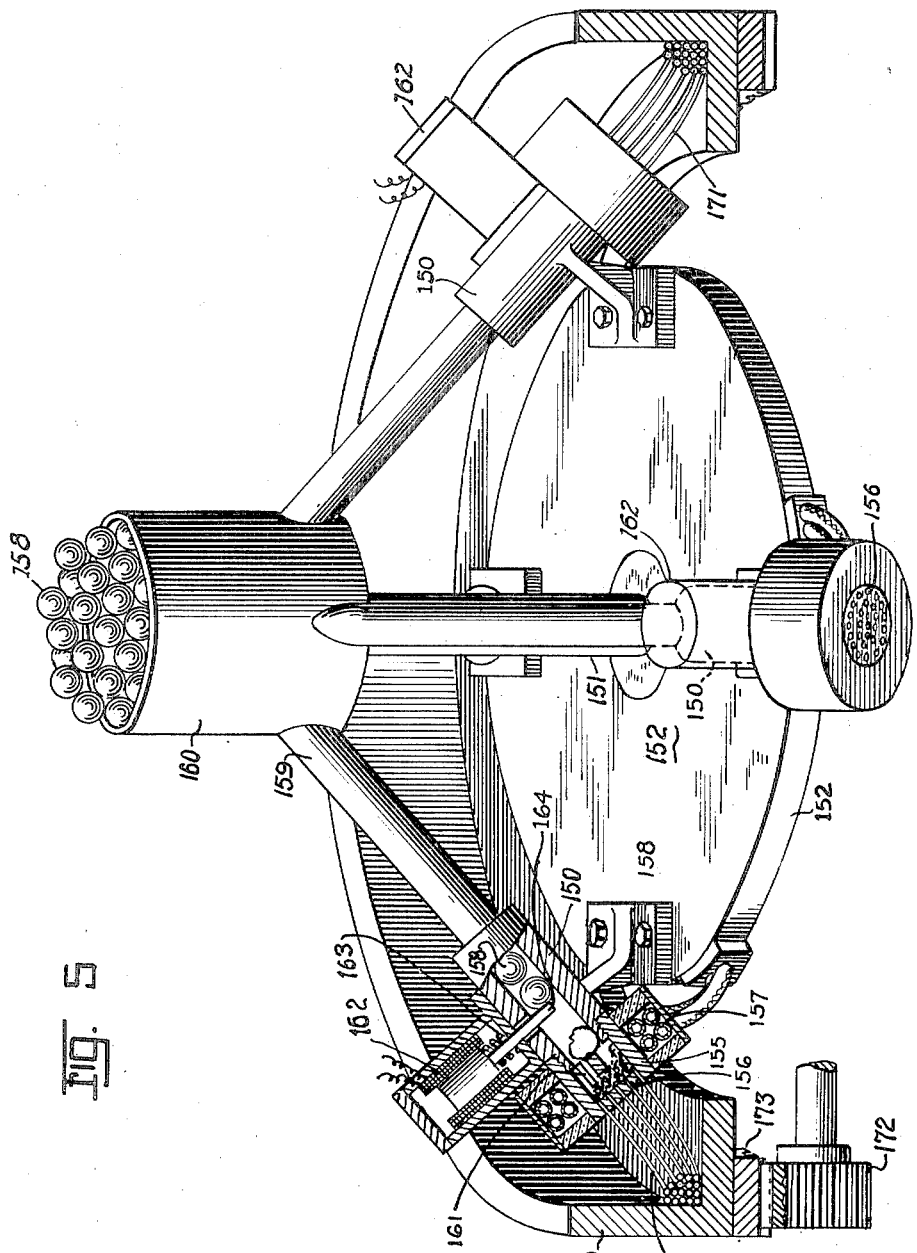

Patented Jan. 31, 1950

2,495,956

UNITED STATES PATENT OFFICE 2,495,956

METHOD OF PRODUCING GLASS FIBERS

Everett J. Cook, Toledo, Ohio, assignor, by mesne assignments, to Glass Fibers, Inc., Waterville, Ohio Application November 13, 1945, Serial No. 628,056

12 Claims. (Cl. 49—83.1)

This invention relates to a method for producing glass fibers or filaments by mechanical drawing of the filaments under controlled conditions to obtain a uniform diameter of the drawn glass filament. The term fiber or filament as used in this application will refer to fibers that are of a diameter on the order of .00025" and variations therefrom such as from .0001" to .0004", all of which fibers have been drawn by controlling the variables of the controllable conditions under which the glass fibers are drawn, all of which will be hereinafter more fully disclosed.

One of the principal objects of the invention is to provide a method for mechanically drawing glass fibers or filaments wherein the conditions under which the fibers are drawn are accurately controlled to obtain a drawing of the fibers at a uniform and constant diameter.

Another object of the invention is to provide a method for carrying out the foregoing object wherein a small body of molten glass has a pressure differential established upon opposite sides of the body of glass to cause the molten glass to exude through a plurality of small orifices to establish globule-like reservoirs of molten glass beneath the orifices from which the glass fibers are mechanically drawn.

It is still another object of the invention to provide a method for accomplishing the foregoing objects wherein the pressure differential established upon the body of molten glass and the temperature of the molten glass as well as the rate at which the fibers are mechanically drawn are maintained relatively constant after the proper operating conditions have been established to obtain a predetermined size filament and thereby maintain the diameter of the filament relatively constant while it is continuously being drawn.

It is still another object of the invention that in accomplishing the foregoing objects one or more of the variable conditions under which the glass fibers are mechanically drawn can be changed to effect a change in the diameter of the filament being drawn without requiring a stoppage of the continuous mechanical drawing of the fibers to thereby readily shift from one size fiber to another during a drawing of the fibers.

It is still another object of the invention that in accomplishing the foregoing objects, a body of molten glass is maintained at a substantially predetermined volume by continuously or intermittently feeding glass stock to the body of molten glass in response to a volume change in the body and thereby maintain a relatively constant source of supply for establishing the globule-like reservoirs on the discharge side of a plurality of orifices in a container through which the glass exudes from the container.

These and other objects will become more apparent from the drawings and the following description.

It is still another object of the invention to correlate such factors as temperature of the molten glass, pressure differential upon the body of molten glass, speed of mechanically drawing the fibers, and size of orifice or aperture through which the molten glass is exuded to obtain a determined diameter of drawn glass fiber and after such correlation to maintain the factors constant and thereby maintain a constant diameter of the drawn fiber.

In the drawings:

Figure 1 is a somewhat schematic illustration of apparatus for drawing glass fibers in accordance with this invention, and illustrates one form of a furnace for heating glass stock.

Figure 2 is an enlarged cross-sectional view of the orifice plate of the furnace and illustrates the globule-like reservoirs that are established from which glass fibers are drawn.

Figure 3 is a schematic electrical system for operating the apparatus illustrated in Figure 1.

Figure 4 is a somewhat schematic illustration of a modified arrangement of the apparatus illustrated in Figure 1 wherein the pressure differential upon the body of molten glass is obtained by use of a low pressure or vacuum source instead of a pressure source as disclosed in Figure 1.

Figure 5 is a perspective view partially in cross-section, of an apparatus for obtaining pressure differential upon a body of molten glass by means of centrifugal force.

In this invention, the glass fibers or filaments are drawn mechanically from a supply or body of molten glass in such a manner that the diameter of the filaments is accurately controlled. Preferably, a plurality of fibers are drawn simultaneously, all under the same controlled conditions to thereby provide for a bundling or grouping of the fibers upon a suitable reel or spool from which the fibers can subsequently be removed for manufacture into thread or yarn.

There is a peculiar quality in glass in the manufacture of glass fibers or filaments, in that the tensile strength of the glass fibers is increased as the temperature at which the glass fibers are drawn is reduced. However, as the temperature of the glass is reduced in an endeavor to obtain the higher tensile strength in the glass fibers, many difficulties have been encountered in properly controlling the diameter of the fibers or filaments to obtain absolute uniformity thereof. In this invention, however, the glass fibers or filaments are mechanically drawn under controlled conditions under which the lowest possible temperature of the glass consistent with good drawing qualities, is used. Preferably, the body of glass is heated within a metal furnace by conduction and radiation from the walls thereof, which walls are heated inductively by the use of high frequency energy. The temperature of the furnace is accurately controlled to maintain a predetermined condition of fluidity of the molten glass in the furnace so that a predetermined pressure differential applied upon the body of molten glass will cause the molten glass to exude through a plurality of orifices in one wall of the furnace at a predetermined rate and thereby allow fibers or filaments to be drawn from globule-like reservoirs established at the outlet of each of the orifices at a predetermined rate to establish a predetermined size filament.

By controlling the temperature of the furnace, and thus the fluidity of the molten glass therein, the pressure differential upon the molten body of glass, the size of the orifices in the wall of the furnace and the rate at which the fibers are drawn, the diameter of the drawn filaments can be controlled and varied to meet any requirement.

An apparatus for mechanically drawing glass fibers under controlled conditions in accordance with this invention is illustrated in Figures 1, 2 and 3. This apparatus consists of a furnace 10 that has a crucible 11 that holds a body of molten glass 12. The crucible 11 is constructed of a metal, preferably of a non-oxidizable nature, at the high temperatures at which the metal is worked, which in this invention will be from 2200° F. to 2300° F., as preferable temperature. Such a metal is found in platinum or in platinum rhodium alloys.

The crucible 11 is provided with an aperture plate 13 that forms the bottom wall thereof. This aperture plate, more clearly illustrated in Fig. 2, has a plurality of apertures 14 therein, which apertures are formed in protrusions 15 that extend downwardly from the aperture plate 13. The molten glass within the crucible 11 exudes from the apertures 14 under controlled conditions hereinafter referred to and forms globule-like reservoirs of molten glass 16 at the end of each of the apertures 14. The glass filaments or fibers 17 have their genesis in the globules 16 and are drawn therefrom by a mechanical means hereinafter referred to.

The crucible 11 is of relatively small size and has a high frequency coil 18 positioned around the same. This coil 18 may consist of a tubular member such as copper, under which conditions the tubular member 18 will have water circulated therethrough to retain the same at a relatively low temperature and avoid melting of the tube due to radiation from the walls of the crucible 11. However, the coil 18 may be constructed from a small platinum tube, under which conditions it will not be necessary to cool the tube, and some loss due to radiation from the crucible 11 is thereby avoided. The high frequency coil 18 is adapted to be connected to the output of a high frequency generator or oscillating unit, such as the simplified form of such unit illustrated in Fig. 3, hereinafter more fully described, for impressing a frequency of 1.5 megacycles on the coil 18, which frequency has been found most favorable for heating the platinum crucible 11.

The crucible 11 is secured upon the end of a ceramic tube 20 that has an opening 21 therein to receive the glass stock 22. The opening 21 in the ceramic tube 20 may be provided with a platinum alloy lining 23 to prevent spalling and flaking of the side wall of the tube 20 and thus avoid contamination in the molten glass body 12.

The glass stock 22 is preferably in what may be termed strip form, which in this instance takes the form of a rod that is fed into the crucible 11 under suitable control for maintaining the volume of the body of molten glass 12 in the crucible 11 substantially constant at all times. It is, of course, understood that when using the term "strip" in connection with the glass rod in this invention, the term includes such other forms of glass as tubes, strips, whether continuously fed to the furnace or fed in pieces that may be tacked together.

The upper end of the ceramic tube 20 is provided with a resilient sealing member 24 that is adapted to engage the glass strip 22 to seal against the same and thereby close the interior of the crucible 11 and the opening 21 in the tube 20 so that a gaseous pressure may be maintained in the crucible 11.

The ceramic tube 20 has an opening 25 through the side wall thereof that communicates with an annular recess 26 provided in the heat insulating wall 27 surrounding the tube 20. This annular recess 26 connects with an opening 28 in the wall 27 that connects with a pressure supply conduit 29 through which gaseous pressure is supplied into the interior of the tube 20 and the crucible 11. The pressure supply conduit 29 is connected to a suitable source of pressure 30 that is maintained relatively constant in any desired manner.

A control valve 35 is placed in the supply conduit 29 to regulate the value of the pressure applied into the interior of the crucible 11, and to regulate the pressure within the crucible 11 constantly at a substantially predetermined value. The pressure reducing and control valve 35 may be of conventional and standard form that is adjustable for regulating the pressure in the outlet side thereof. A gauge 36 may be provided for indicating the pressure that is applied within the interior of the crucible 11. Also, a shut-off valve 37 may be located in the supply conduit 29 for shutting off the gaseous fluid supply, if desired.

It is, of course, to be understood that when referring to gaseous fluids for supply into the crucible 11 that any of the conventional fluids are to be included such as air, the inert gases, or in some instances it may be desirable to utilize a gas such as hydrogen.

The glass strip 22 is fed into the crucible 11 by means of a pair of rolls 40 that are driven by an electric motor 41 through means of the gears 42 and 43. Operation of the motor 41 is controlled by the level of the glass body 12 in the crucible 11 to feed the glass strip 22 at the desired rate to maintain the level of the body of molten glass substantially constant. The motor 41 is connected with suitable electric controls to accomplish the foregoing operation, which electric controls have one terminal thereof connected to the terminal 45 which engages the plate 46 carrying the contact rod 47 that passes downwardly through the ceramic tube 20 with the end 48 thereof in a predetermined position within the crucible 11. The crucible 11 is engaged by a contact member 49 that is connected to the opposite terminal of the electric controls for operating the motor 41.

The furnace 10 is also provided with a temperature-sensitive device 50 for controlling the output of the high frequency oscillator to the coil 18, and thus control the temperature of the crucible 11. The temperature-sensitive device 50 is in effect a mercury thermometer having the three terminals 51, 52 and 53 passing thereinto into engagement with the mercury column 54.

The terminal 51 is a common terminal or ground connection. The upper terminal 53 controls the output of the oscillator in a manner hereinafter described to maintain the temperature of the crucible 11 substantially constant. The terminal 52 also controls the oscillator, and is adapted to cut in a stand-by tube in case the temperature of the crucible 11 should drop below a predetermined value for some accidental or unusual reason.

The electrical system for controlling the temperature of the crucible 11, and for controlling the feeding of the glass strip 22 is more particularly illustrated in Figure 3 wherein there is shown a simplified form of high frequency oscillator. In the electrical wiring diagram shown in Figure 3, there is illustrated a full wave rectifier 60 having the output terminals 61 and 62 thereof. An oscillator or high frequency generator 70 is connected to the output terminals 61 and 62 of the rectifier 60. The high frequency generator may consist of a conventional oscillating circuit to obtain the desired frequency on the output side thereof for delivery to the high frequency coil 18. As illustrated in Fig. 3, the high frequency generator may consist of an oscillator tube 71 and a stand-by oscillator tube 72 that are supplied with current from the rectifier 60. One side of the transformer 73 is connected to the anode 74 of the oscillator tubes 71 and 72, and the other side of the transformer 73 is connected with the cathodes 75 of the oscillator tubes 71 and 72 in conventional manner in cooperation with the rectifier 60. The secondary coil 76 of the transformer 73 has the opposite terminals thereof connected with the opposite terminals of the high frequency coil 18 for thereby transmitting the energy of the high frequency generator to the high frequency coil. The grid-exciting coil 77, that may be a compound winding in the transformer 73, supplies the grid circuit of the oscillator tubes 71 and 72, and by varying the voltage in the grid circuit of the oscillator tubes 71 and 72, the output of the oscillator 70 is thereby controlled. Such a control of the grid circuit may be had through the potentiometer 78.

The grid circuit of the oscillator tube 71 is continuously in circuit while the grid circuit of the oscillator tube 72 is provided with the contacts B₁ that are operated by the relay coil B that is placed in circuit with the terminal 52 of the temperature-sensitive device 50. The contacts B₁ are opened when the relay B is energized, which is a normal condition, thereby allowing the tube 72 to act as a stand-by tube.

The potentiometer 78 of the high frequency generator 70 is adapted to float over the resistance element thereof to control the output of the generator as this potentiometer is caused to operate by the electric motor 80. The electric motor 80 is adapted to cause the potentiometer to move in one direction and a torsion spring 81 connected to the shaft between the motor 80 and the potentiometer 78 is adapted to cause the potentiometer to move in an opposite direction. The direction of movement of the potentiometer to vary its resistance is controlled by the position of the mercury column 54 in the temperature-sensitive device 50 with relation to the terminal 53 thereof. When the mercury column 54 engages the terminal 53 or is above the same, an electric circuit will be made through the relay coil A which closes the contacts A₁ and thereby energizes the motor 80 to actuate the potentiometer 78 and reduce the output of the high frequency generator 70. Conversely, when the mercury column 54 is below the upper terminal 53 of the temperature-sensitive device 70, the relay coil A will be de-energized, thereby de-energizing the electric motor 80 and allowing the torsion spring 81 to actuate the potentiometer 78 in the opposite direction and thereby increase the output of the high frequency generator 70. It will thus be seen that the temperature-sensitive device 50 will thus control the output of the high frequency generator 70 with sufficiently close accuracy as to maintain the temperature of the crucible 11 at a substantially constant value. The preferable temperature conditions involved are approximately 2250° F. plus or minus 10° F.

As previously mentioned, the oscillator tube 72 acts as a stand-by tube, and assuming the apparatus is in operation, the mercury column 54 of the temperature-sensitive device 50 will be above the terminal 52 thereof thus maintaining energized the relay coil B through the holding circuit contacts B₂ that are closed, thus holding the contacts B₁ open to render the grid circuit of the tube 72 ineffective. Should the temperature of the crucible 11 fall sufficiently low that the mercury column of the temperature-sensitive element 60 disconnects with the terminal 52, the relay coil B will be de-energized, thus allowing contacts B₁ to close to cut in the second oscillator tube 72 and thus quickly and substantially increase the output of the high frequency generator 70 to overcome the abnormal condition.

The electric motor 41 for feeding the glass strip 22 into the furnace 10 is normally rendered active by the normally closed contacts C₁ of the relay C, the relay C being de-energized as long as the body of molten glass is out of engagement with the end 48 of the contact rod 47. However, when the level of the molten glass reaches the end 48 of the contact rod 47, electric circuit will be made through the now conductive body of molten glass to energize the relay C and thus open the contacts C₁ to de-energize the motor 41 and thus stop feeding of the glass strip 22. In the electric circuit in Fig. 3, the contact element 47 is illustrated by the switch 47a.

The filaments or fibers 17 are mechanically drawn by a reel or spool 90 that is suitably carried upon supporting bearings. This spool or reel 90 is driven by an electric motor 91 through means of a variable speed mechanism 92, the variable speed mechanism being provided for establishing and maintaining any desired speed of rotation of the reel or spool 90.

The fibers 17 are collected together and are adapted to pass through a guide ring 95 to collect the bundle of fibers upon the reel or spool 90. The speed of rotation of the spool or reel 90 is one of the governing factors for controlling the diameter of the filaments or fibers 17.

There are four principal factors which govern the diameter of a fiber or filament during the drawing thereof, and which factors must be correlated to obtain a desired filament diameter, and after correlation of the factors they must remain constant thereafter during the drawing of the filament to maintain the diameter of the filament constant. These four main factors are (1) establishing a predetermined temperature of the molten glass from which the fibers are drawn and maintaining the temperature constant thereafter, (2) establishing a pressure differential upon opposite sides of the body of molten glass in the furnace correlated with the temperature of the glass to exude the molten glass through the orifices in the orifice plate at a predetermined rate and maintain the pressure differential constant during the drawing operation, (3) establishing a rate of drawing the fibers from the molten glass at the ends of the orifices that is correlated with the temperature of the glass to mechanically draw the fibers to a predetermined degree of fineness as established by the rate of draw and thereafter hold the rate of draw constant during the drawing operation, and (4) establishing a predetermined size orifice in the orifice plate correlated to the temperature of the molten glass in the crucible and the pressure differential established upon that body of glass to permit passage of the molten glass through the orifice at just a sufficient rate to allow drawing of the fibers from the molten glass as it exudes through the orifice at the predetermined rate established by the mechanical drawing means and still retain a reservoir of molten glass at the orifices from which the fibers can be drawn.

In the apparatus disclosed herein a predetermined pressure is maintained upon the body of glass in the crucible 11 which establishes the pressure differential previously referred to upon opposite sides of the body, that is, the top and bottom thereof since the top surface of the body of glass is under pressure and the lower surface is at atmospheric pressure through the orifices 14, whereby the molten glass is exuded through the nozzle orifices 14 at a predetermined rate. It will readily be appreciated that the fluidity of the body of glass in the crucible 11 greatly affects the rate at which the glass exudes through the orifices 14, hence the temperature of the molten glass is established and maintained at that temperature satisfactory for proper delivery of the glass through the nozzle orifices to establish the globule-like reservoir 16 beneath the orifices 14.

Assuming that the rate of drawing of the fibers is constant and all other factors previously mentioned are constant except the pressure applied upon the body of molten glass to establish the pressure differential, the effect of a change in the pressure differential is illustrated in the experimental results set forth below wherein the temperature of the glass body in the crucible 11 was maintained at 2230° F. plus or minus 20° F. and the speed of drawing of the fibers was 4,000 feet per minute through .035" aperture openings.

| Air pressure ins. of water | Diam. fiber, inches | lbs. drawn per hour |
|---|---|---|
| 8 | .00019 | .312 |
| 12 | .00023 | .375 |
| 18 | .00022 | .583 |
| 24 | .00031 | .729 |
| 30 | .00036 | .833 |
| 36 | .00037 | 1.105 |

A second test in which the aperture openings were .040" gave the following tabulated results:

| Air pressure ins. of water | Diam. fiber, inches | lbs. drawn per hour |
|---|---|---|
| 4 | .00028 | .625 |
| 8 | .00030 | .729 |
| 12 | .00033 | 1.146 |
| 18 | .00035 | 1.458 |
| 24 | .00037 | 1.583 |

From the foregoing it will be apparent that with three of the afore-mentioned factors constant, the pressure upon the body of molten glass, and thus the pressure differential, has a direct bearing upon the diameter of the filament that is drawn, an increasing pressure causing a greater flow of molten glass which is taken up in the filament by an increased diameter thereof.

With all factors remaining constant except the temperature of the body of glass in the crucible 11, the following test results were obtained when using .040" apertures, an air pressure of 6" of water and a speed of drawing of 4,000 feet per minute, illustrating the effect of the temperature change on the diameter of the fiber being drawn:

| Temperature Degrees F. | Lbs. per hour Drawn | Diam. of fiber |
|---|---|---|
| 2300 | .563 | .00030 |
| 2280 | .526 | .00027 |
| 2260 | .452 | .00025 |
| 2240 | .400 | .00023 |
| 2220 | .358 | .00021 |
| 2200 | .355 | .00021 |

From the foregoing, it will be apparent that as the temperature of the glass decreases, the diameter of the filament drawn becomes smaller because of the lesser fluidity of the molten glass tending to retard the movement of the glass through the orifices 14 in the orifice plate 13.

As previously mentioned, the rate at which the fibers are drawn from the reservoirs at the orifices affects the diameter of the fiber, as does the diameter of the orifice 14 in the orifice plate 13. In the following tabulated test results that were obtained from tests to determine what effect the rate of draw and the size of orifice would have upon the filament diameter, the rate of draw is set forth on the basis of R. P. M. of a 2" spool which at 7560 R. P. M. effects a rate of draw of approximately 4,000 feet per minute. The temperature of the glass was held to 2230° F. and the air pressure on the molten glass was held to 32" of water. Three separate tests were conducted, using three different-size apertures in the aperture plate 13, namely, .040", .035", and .030". The R. P. M. of the spool was repeated for each test with each size aperture opening, as indicated in the tabulated results:

| R. P. M. 2" spool | Av. diam. fiber |
|---|---|
| .040" APERTURES | |
| 7,200 | .00040 |
| 9,000 | .00036 |
| 10,800 | .00030 |
| .035" APERTURES | |
| 7,500 | .00028 |
| 9,000 | .00027 |
| 10,800 | .00025 |
| 12,150 | .00024 |
| .030" APERTURES | |
| 6,120 | .00035 |
| 7,200 | .00027 |
| 9,000 | .00019 |

From the foregoing results it will appear that the rate of draw affects the filament diameter when all other factors are maintained constant, and that the size of the orifices will also affect filament diameter when other factors are held constant.

In all of the tests that established the various foregoing results, the aperture plate contained 60 apertures.

To average all of the results, it has been found that to obtain a filament diameter of .00025", the most favorable conditions are to hold the temperature of the molten glass in the crucible 11 at 2250° F. plus or minus 10° F. with the size of the orifices in the orifice plate of .040" plus or minus .006". The pressure established upon the body of the glass in the furnace is equal to 10" of water in a water column gauge plus or minus 5" of water, with a rate of draw of the filaments at approximately 10,000 feet per minute. The above average conditions will maintain filament diameters of the desired size plus or minus .00002". Filament diameters of from .0001" to .0004" can be drawn by varying the variable factors as indicated herein.

While the method and apparatus heretofore described with regard to Figs. 1 to 3, inclusive, has set forth the pressure differential upon the body of molten glass in the crucible as being that occasioned by a positive pressure within the crucible, yet this pressure differential can be obtained in other ways such as that illustrated in Figs. 4 and 5.

In Fig. 4 there is illustrated a method of obtaining a pressure differential upon the body of molten glass in the crucible by producing a pressure area of less than atmosphere below the orifice plate of the crucible. Since the apparatus disclosed in Fig. 4 is identical with that described heretofore, with the exception of the means for establishing the low pressure area adjacent the orifice plate, the numerals applied upon the apparatus of Fig. 4 are the same as the numerals applied upon the apparatus illustrated in Fig. 1 but with the suffix a added thereto.

In the apparatus of Fig. 4, the furnace 10a is provided with an enclosure wall 100 around the lower portion thereof which has an opening 101 therein adjacent the guide ring 95a through which the fibers or filaments may be drawn by the reel or spool 90a. The enclosure wall 100 is provided with a conduit 102 that connects the enclosure within the enclosure wall 100 with a source of suction pressure, such as a vacuum pump 103 to produce a pressure less than atmosphere within the enclosure 105.

The crucible 11a is in this instance open to the atmosphere through a port passage 106 provided in the wall of the furnace 10a. Thus, with the enclosure 105 maintained at a pressure less than atmosphere, a pressure differential is established upon the body of molten glass 12a within the crucible 11a tending to move the molten glass through the nozzle orifices 14a in the same manner as the positive pressure applied within the crucible 11 urges the molten glass through the nozzle orifices 14. By varying the sub-atmosphere pressure within the enclosure 105, the pressure differential upon the body of molten glass may be varied to control the rate of movement thereof through the nozzle orifices 14.

In Fig. 5 there is illustrated an apparatus whereby the pressure differential upon the body of molten glass in the crucible may be obtained by centrifugal force, and wherein the movement of the furnace to obtain the action of centrifugal force upon the body of molten glass therein aids in the drawing of the glass fibers or filaments.

In the apparatus of Fig. 5, a plurality of individual furnaces 150 are positioned radially about a center-post 151 and are secured to a platform 152 which rotates with the center-post 151 as driven in any suitable manner, preferably by means of a variable speed drive mechanism to regulate and control the speed of rotation of the furnaces 150. Since all of the furnaces 150 are of like construction, only one of them will be described.

The furnace 150 may consist of a metal crucible 155 that is constructed of platinum or a platinum alloy and has a plurality of nozzle orifices 156 therein that are like the nozzle orifices 14. A high frequency coil 157 is provided around the furnace 150 to heat the crucible inductively and thus heat the glass therein.

The furnace 150 may be fed by the use of glass marbles 158 through the chute 159 extending from the hopper 160. The glass marbles 158 are fed intermittently, depending upon the level of the molten glass in the crucible 155.

The furnace 150 is provided with the contact member 161 which is like the contact rod 47 of Fig. 1 and is adapted to operate a solenoid 162 in the same manner as the electric motor 41 is operated for controlling the feeding of the glass strip 22 in Fig. 1. The electric circuit for operating the solenoid is the same electric circuit as for operating the motor 41 illustrated in Fig. 3. As long as the electric circuit remains open, the spring 163 in the solenoid 162 holds the gate 164 in retracted position to allow continuous feeding of the mables 158. However, when the level of the molten glass rises to a point to engage the contact member 161, the solenoid 62 is energized to place the gate in the position illustrated in Fig. 5 and thus prevent further feeding of the mables 158 until the level of the molten glass is such as to be out of contact with the contact member 161.

A collecting trough 170 for collecting the glass fibers or filaments 171 forms a circle around the furnaces 150, and is adapted to be driven by means of the gears 172 and 173. The gear 172 is suitably connected to a variable speed drive mechanism for controlling the rotating speed of the collecting trough 170. By controlling the speed of rotation of the furnaces 150, the degree of centrifugal force applied upon the body of molten glass in the furnaces 150 is regulated to a value sufficient to obtain the desired exuding rate of the molten glass through the nozzle orifices 156. The speed of rotation of the collecting ring 170 is regulated relative to the speed of rotation of the furnaces 150 to obtain the desired differential in speed of rotation and obtain a desired rate of draw upon the filaments 171.

When starting to draw the filaments in the apparatus illustrated in Figure 5, the filaments will initially attach themselves to the collecting ring 170, and will thereafter be drawn at a high rate of speed to obtain the desired fineness of diameter of the filaments.

The variable factors previously set forth with regard to the apparatus disclosed in Fig. 1 affect the drawing of fibers in the apparatus disclosed in Fig. 5 in the same manner as heretofore referred to, and the same general type of controls can be applied to the apparatus of Fig. 5 as has been applied to the apparatus shown in Fig. 1.

In the foregoing description, the heating of the crucible 11 has been referred to as being occasioned by high frequency energy, which is preferable. However, other methods of heating the glass are within the scope of the invention as contemplated and the method specifically disclosed is by way of explanation and is not to be considered limiting.

While the apparatus disclosed and described

Having thus full described my invention, what I claim as new and desire to secure by Letters Patent is:

1. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein of uniform temperature in the mass adjacent the apertures, establishing a constant pressure differential between opposite sides of the body of molten glass disposed against said apertures of sufficient intensity to cause positive movement of the molten glass through the plurality of apertures at a constant rate in slowly moving streams attenuating the exuded glass streams solely by a mechanical device moving at a constant rate and at high speed to produce continuous glass fibers of a determined and controlled diameter governed by the differential of rate of movement between the exuded streams and the attenuated fibers.

2. The method of producing glass fibers which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein, establishing a constant pressure differential between opposite sides of the body of molten glass in the chamber of sufficient intensity to cause positive movement of the glass through the plurality of apertures at a constant rate and form and maintain globule-like reservoirs of molten glass at the discharge end of each of the apertures in the heating chamber, and drawing an attenuated glass filament from each of the globule-like reservoirs by a mechanical device moving at a constant rate and high speed during the attenuation of the fibers.

3. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, and effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element.

4. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure above the body of molten glass that is greater than the gaseous pressure below the apertures which added to the pressure of the head of glass above the apertures results in a total pressure effective on the body of molten glass to exude the glass through the plurality of apertures under the effect of the said total pressure, maintaining said total pressure at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, and effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element.

5. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and controlling the diameter of the attenuated fibers by establishing a constant rate of movement of the attenuated fibers relative to the rate of movement at which the molten glass is exuded through said apertures.

6. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, maintaining the temperature of said heating chamber and the molten glass therein at a constant value throughout the mass of the chamber and the glass to obtain the uniform temperature condition of the molten glass in each of the apertures, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and correlating the factors of pressure differential, temperature of the body of molten glass and speed of attenuation of the glass fibers relative to the size of the aperture through which the glass is exuded to establish and to maintain a determined controlled diameter of attenuated fiber.

7. The method of producing continuous glass fibers of uniform diameter which comprises, heating glass stock within a chamber having a uniform transverse cross-section from a central point thereof by means of the use of high frequency heating elements disposed uniformly around the said chamber to uniformly heat the said chamber and a supply of molten glass therein throughout its entire mass, establishing a gaseous pressure on the body of molten glass to effect positive movement of the molten glass through apertures provided in one horizontal wall of the heating chamber, maintaining said pressure at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, and effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element.

8. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and maintaining constant the heating effect on the chamber and the pressure differential on the glass body while varying the speed of movement of the attenuated fiber to obtain a controlled change in the diameter of the attenuated fiber.

9. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and maintaining constant the speed of movement of the attenuated fiber and the pressure differential on the glass body while varying the heating effect on the chamber to obtain a controlled change in the diameter of the attenuated fiber.

10. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and maintaining constant the heating effect on the chamber and the speed of movement of the attenuated fiber while varying the pressure differential on the glass body to obtain a controlled change in the diameter of the attenuated fiber.

11. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, and coordinating the factors of pressure differential, heat applied to the heating chamber, and the rate of attenuation of the fibers at related values to regulate the diameter of the attenuated fibers as governed by the differential of rate of movement between the exuded streams and the attenuated fibers under the particular condition of fluidity of the glass as controlled by the heat applied to the heating chamber.

12. The method of producing continuous glass fibers of uniform diameter which comprises, feeding glass stock into a heating chamber having a plurality of apertures in one horizontal wall thereof of considerably larger size than the glass fibers to be produced, heating the glass stock within the chamber by use of high frequency heating to maintain a supply of molten glass therein at uniform temperature throughout the mass, establishing a gaseous pressure on one side of the body of glass that is greater than the gaseous pressure on the opposite side of the body of glass at the apertures to exude the glass through the plurality of apertures under the effect of the differential of pressure between the said pressures, maintaining said pressure differential at a determined and constant value to obtain a constant rate of movement of glass streams through the apertures, attenuating the glass streams into glass fibers by contacting the glass fibers of the attenuated streams with a mechanical element moving at a high speed, said attenuation occurring between said chamber and said element, effecting a cooling of the glass fibers between the chamber and the element at a gradual rate of temperature reduction from the temperature of the molten glass at said apertures to a temperature condition of the glass where due to solidification of the glass attenuation ceases solely by natural radiation of heat from the glass fibers under attenuation into the atmosphere around the glass fibers occurring over a relatively long length of the fibers between the chamber and said element, coordinating the factors of pressure differential, heat applied to the heating chamber, and the rate of attenuation of the fibers at related values to regulate the diameter of the attenuated fibers as governed by the differential of rate of movement between the exuded streams and the attenuated fibers under the particular condition of fluidity of the glass as controlled by the heat applied to the heating chamber, and thereafter maintaining these factors constant to maintain a constant diameter of the drawn fiber.

EVERETT J. COOK.

REFERENCES CITED

The following references are of record in the file of this patent:

UNITED STATES PATENTS

| Number | Name | Date |
|---|---|---|
| 2,187,094 | Pink | Jan. 16, 1940 |
| 2,219,346 | Thomas et al. | Oct. 29, 1940 |
| 2,229,489 | Barnard | Jan. 21, 1941 |
| 2,234,986 | Slayter | Mar. 18, 1941 |
| 2,294,266 | Barnard | Aug. 25, 1942 |